United States Patent [19]

Duffin

[11] Patent Number: 5,177,336
[45] Date of Patent: Jan. 5, 1993

[54] METHOD OF REFEEDING ELECTRICAL DISCHARGE MACHINING ELECTRODES

[75] Inventor: Jason Duffin, Leicester, United Kingdom

[73] Assignee: Moss Machines Limited, Leicester, United Kingdom

[21] Appl. No.: 725,513

[22] Filed: Jul. 3, 1991

[30] Foreign Application Priority Data

Jul. 4, 1990 [GB] United Kingdom ............... 9014798

[51] Int. Cl.$^5$ .................... B23H 1/00; B23H 7/32; B23H 9/14
[52] U.S. Cl. ....................... 219/69.17; 219/69.15; 219/69.16
[58] Field of Search ............... 219/69.15, 69.16, 69.17, 219/69.2

[56] References Cited

U.S. PATENT DOCUMENTS

| | | | |
|---|---|---|---|
| 3,614,371 | 10/1971 | Simpkins et al. | 219/69.2 |
| 3,729,609 | 4/1973 | Check et al. | 219/69.16 |
| 4,044,216 | 8/1977 | Check et al. | 219/69.15 |
| 4,121,081 | 10/1978 | Baker | 219/69.15 |
| 4,188,522 | 2/1980 | Baker | 219/69.15 |
| 4,191,878 | 3/1980 | Check et al. | 219/69.15 |

FOREIGN PATENT DOCUMENTS 1569561 6/1980 United Kingdom .
1571666 7/1980 United Kingdom .

Primary Examiner—Geoffrey S. Evans
Attorney, Agent, or Firm—Antonelli, Terry, Stout & Kraus

[57] ABSTRACT

In an electrical discharge machining apparatus having a nose guide (12) and an electrode datum (26) movable relative to one another, a cartridge (14) movable relative to the nose guide, a plurality of substantially parallel electrodes (16) supported by the nose guide (12) and the cartridge (14) and a cartridge clamp (32) engageable to prevent relative motion between the electrodes (16) and the cartridge (14), a method of refeeding and re-aligning the electrodes between machining operations compensates for erosion. In this method, the separation of the datum (26) from the nose guide (12) and cartridge (14) is decreased while protruding electrodes that engage the datum are received back into the cartridge. Because the nose guide and cartridge remain in fixed relation at that stage there is no need for a friction pad between the cartridge (14) and the electrodes (16). The electrode datum may be a surface of the workpiece that is to be machined.

14 Claims, 3 Drawing Sheets

METHOD OF REFEEDING ELECTRICAL DISCHARGE MACHINING ELECTRODES

TECHNICAL FIELD

The present invention relates to electrical discharge machining apparatus and in particular to such apparatus wherein parallel electrodes are used simultaneously to machine a plurality of small holes. The invention provides a method for refeeding the electrodes between machining operations to compensate for erosion of the electrode tips.

BACKGROUND ART

Known electrical discharge machining apparatus typically includes a plurality of parallel wire-like electrodes, slidably held in a cartridge and passing through a nose guide to engage the workpiece that is to be machined. The cartridge is mounted for linear movement with respect to the nose guide in a direction parallel to the electrodes, and the nose guide is mounted for movement towards and away from the workpiece. The cartridge is equipped with a clamp that can engage the electrodes and prevent them from sliding relative to the cartridge.

During the machining operation, the nose guide is placed adjacent to the workpiece and, with the clamp engaged, the cartridge is moved forward, so that the electrodes slide through the nose guide and into the workpiece, machining holes as they advance. Power is provided for the electrical discharges through one or more contact plates on the cartridge, against which the electrodes are urged by the action of the clamp.

The tips of the electrodes become eroded as machining proceeds and so means are provided for refeeding the electrodes forward from the cartridge between machining operations to replace the lengths of electrode that have been lost by erosion and realign the electrode tips. The method of refeeding employed must feed different electrodes by different amounts in order to compensate for unequal erosion rates and a number of methods have been suggested to cope with this problem.

British patent number 1569561 discloses an electrical discharge machining apparatus wherein the cartridge includes a friction pad in engagement with the electrodes to resist their sliding motion. At the end of a machining operation, a clamp on the nose guide is engaged with the electrodes to hold them fixed while the cartridge is retracted from the nose guide. Then, for refeeding to occur, the clamp on the nose guide is released and the cartridge is advanced once more. The friction pad on the cartridge urges the electrodes forward in conjunction with the movement of the cartridge, overcoming the friction naturally occurring in the nose guide, until their tips reach the workpiece. Then the forward movement of the electrodes is prevented and the friction pad slides over them as the motion of the cartridge continues.

This method has the disadvantage that it is difficult to choose a coefficient of friction between the friction pad and the electrodes that allows the electrodes to be positively driven forwards and yet does not cause them to buckle during the slipping motion. The electrodes may be as little as 0.1 mm in diameter and so buckle very easily.

British patent number 1571666 discloses a similar apparatus wherein the electrodes are urged forward during the refeeding operation by means of rollers until they reach the workpiece, but there is the same problem of obtaining a suitable coefficient of friction with the rollers to prevent buckling of the electrodes.

SUMMARY OF THE INVENTION

In an electrical discharge machining apparatus having a nose guide and an electrode datum movable relative to one another, a cartridge movable relative to the nose guide, a plurality of substantially parallel electrodes supported by the nose guide and by the cartridge so as to be longitudinally movable, and a cartridge clamp engageable to prevent relative motion between the electrodes and the cartridge, the invention provides a method of refeeding the electrodes, comprising in order the steps of:

(a) increasing a separation of a datum from the nose guide, cartridge and electrodes by a predetermined distance;

(b) advancing the cartridge relative to the nose guide by the predetermined distance, while the cartridge clamp is engaged;

(c) decreasing the separation of the datum from the nose guide and cartridge by the predetermined distance while the cartridge clamp is disengaged, thereby engaging at least two of the electrodes with the datum so as to cause relative movement between those electrodes and the nose guide and cartridge;

(d) optionally repeating steps (a) to (c) a number of times; and (e) retracting the cartridge relative to the nose guide while the cartridge clamp is disengaged.

In an apparatus further including a nose guide clamp engageable to prevent relative motion between the electrodes and the nose guide, the invention further provides for the engagement of the nose guide clamp during step (e) of the method.

The electrode datum may conveniently be a surface of the workpiece that is next to be machined. Alternatively it may be a separate template that is introduced specifically for the purpose of aligning the electrodes prior to machining. A separate template has the advantage that its profile need not match that of the front surface of the workpiece. In particular, the profile may be that of the rear surface so as to ensure that the electrodes reach the rear surface at approximately the same time during machining.

The relative motion between nose guide and datum may be achieved by keeping the nose guide fixed and moving the datum relative to it, particularly where the datum is a template rather than the workpiece itself.

The advantage of the present method over that of the prior art is that the nose guide remains in fixed relation to the cartridge while the electrodes are being received back into the cartridge. This removes the need for a friction pad on the cartridge to overcome friction between the electrodes and the nose guide, and thus the electrodes do not buckle during refeeding.

BRIEF DESCRIPTION OF THE DRAWINGS

FIGS. 2 to 5 illustrate schematically in side elevation the sequence of operations of the method of the invention, wherein:

FIG. 2 shows the apparatus following a machining operation.

FIG. 3 shows the apparatus prepared for the refeeding operation.

FIG. 4 shows the apparatus after a first stage of a refeeding cycle.

FIG. 5 shows the apparatus after a second stage of a refeeding cycle.

DESCRIPTION

Figure 1:
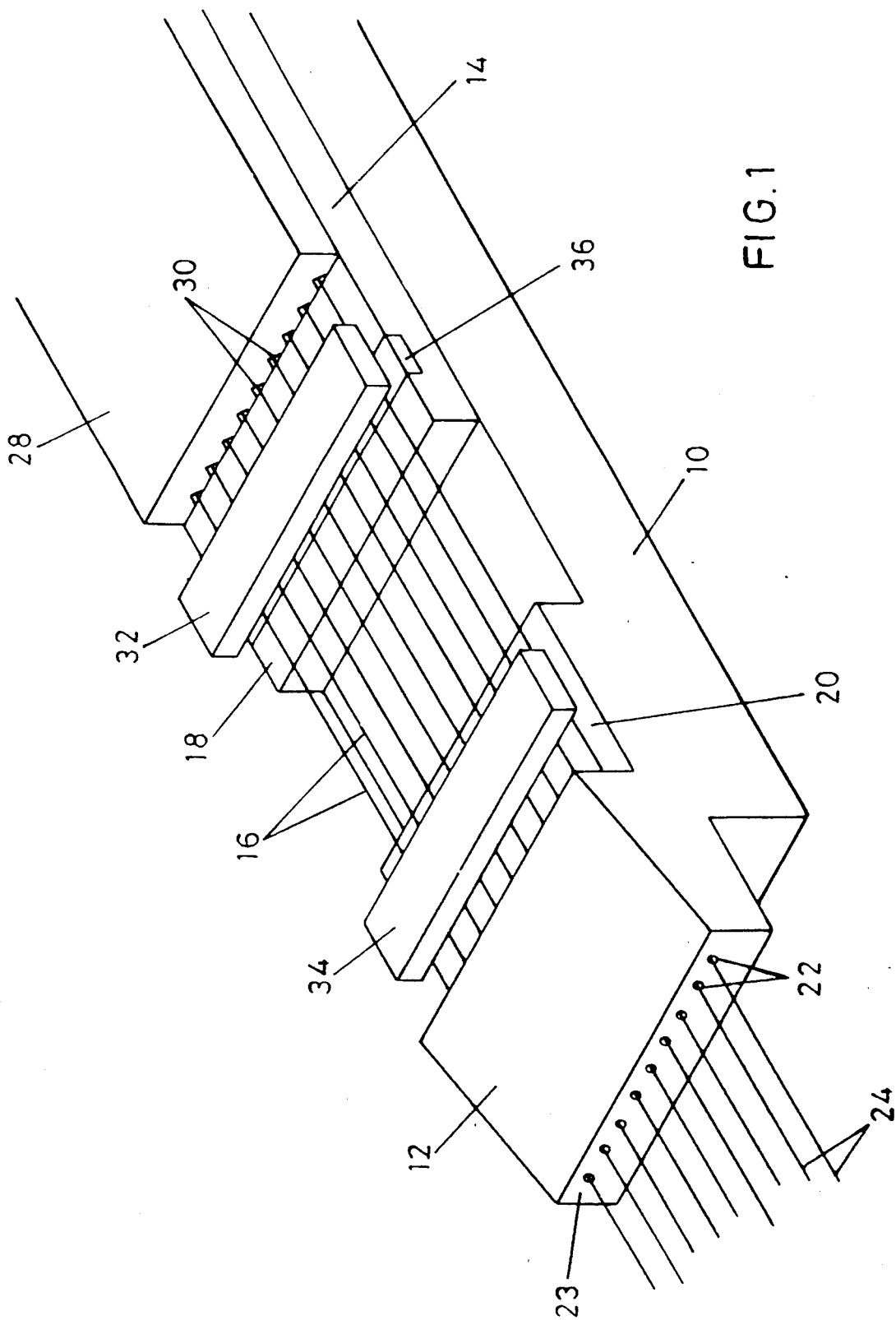
FIG. 1 is a schematic perspective view of the apparatus with which the method of the invention is carried out.

FIG. 1 shows the part of an electrical discharge machining apparatus that controls the feeding of electrodes to a workpiece. A carriage 10 supports at its front end an integrally formed nose guide 12. Behind the nose guide, a cartridge 14 is mounted for linear sliding motion relative to the carriage 10 and parallel to its length. A plurality of electrodes 16 is supported on an upper surface 18 of the cartridge 14 and on an upper surface 20 of the nose guide 12 that lies in the same plane as the surface 18 of the cartridge. The electrodes 16 pass through holes 22 in the front 23 of the nose guide 12 so that the tips 24 of the electrodes protrude towards the workpiece to be machined. The electrodes are supported so that they may slide longitudinally relative to the cartridge 14 and the nose guide 12. A first actuator (not illustrated) is provided for driving the motion of the cartridge 14 relative to the carriage 10.

On a rearward part of the surface 18 of the cartridge is fixed a cover 28, which has parallel grooves 30 for guiding the electrodes. A clamp 32 is provided above the cartridge 14 so that when the cartridge clamp 32 is operated, it engages the electrodes 16 and prevents their motion relative to the cartridge 14. A second clamp 34 is provided above the surface 20 of the nose guide so that when the nose guide clamp 34 is operated, it engages the electrodes 16 and prevents their motion relative to the nose guide 12.

During machining, the electrodes 16 must be supplied with a high voltage in order to generate the necessary sparks at their tips 24. The voltage is applied to the electrodes 16 via one or more electrical conductors 36 set into the surface 18 of the cartridge, below the cartridge clamp 32. Thus, when the clamp is operated, it urges the electrodes against the conductor 36 and ensures a good electrical contact. The cartridge 14, nose guide 12, cover 28 and clamps 32 and 34 are all made of an electrically insulating material.

Although the conductor 36 is illustrated for the sake of simplicity as a single strip extending across the width of the cartridge 14, there may alternatively be separate conductors to supply individual electrodes independently. In some prior art apparatus, grooves for guiding the electrodes have been provided in the surface 18 of the cartridge but the illustrated embodiment having grooves 30 in the cover 28 is preferred since it enables the surface 18 and the top face of the conductor 36 to be machined flat, smooth and coplanar so that a flat base of the clamp 32 can bear down evenly on electrodes 16 arranged on the flat, smooth top surface of the cartridge 14 and conductor 36, providing a good electrical contact between the electrodes 16 and the conductor 36 without precise manufacturing tolerances.

Turning now to the method of refeeding the electrodes 16, FIGS. 2 to 7 and the following description illustrate the sequence of steps in the embodiment where the cartridge member 10 is linearly movable relative to a fixed electrode datum 26, by means of a second actuator (not illustrated). In an alternative embodiment, the carriage member 10 remains fixed and the electrode datum 26 is linearly moveable towards and away from it. In principle, the sequence of steps is the same in both embodiments. However, where in the illustrated embodiment the carriage 10 moves through a certain distance in a particular direction, the same effect is achieved in the alternative embodiment by moving the datum 26 through the same distance in the opposite direction.

The electrode datum 26 may be a surface of the workpiece to be machined or a separate template introduced specifically for the purpose of aligning the electrodes during refeeding.

Figure 2:
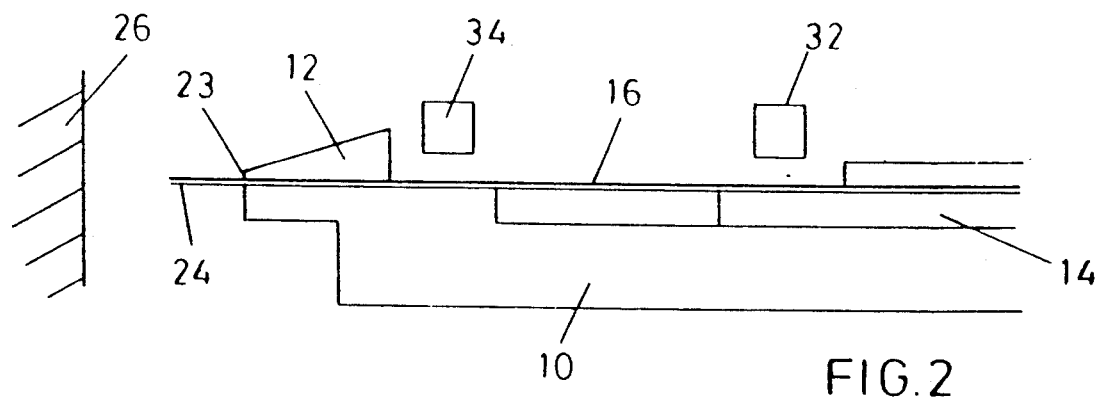

FIG. 2 represents the apparatus of FIG. 1 in its configuration after a machining operation has been completed. The voltage supply to the conductor 36 is switched off, the carriage 10 has been retracted to withdraw the nose guide 12 from the electrode datum 26, the cartridge 14 is withdrawn away from the nose guide 12, both clamps 32 and 34 are released and the electrode tips 24 are at various and unpredictable positions. Indeed, the withdrawal of the cartridge 14 may have resulted in some of the electrode tips 24 not projecting beyond the front 23 of the nose guide.

Figure 3:
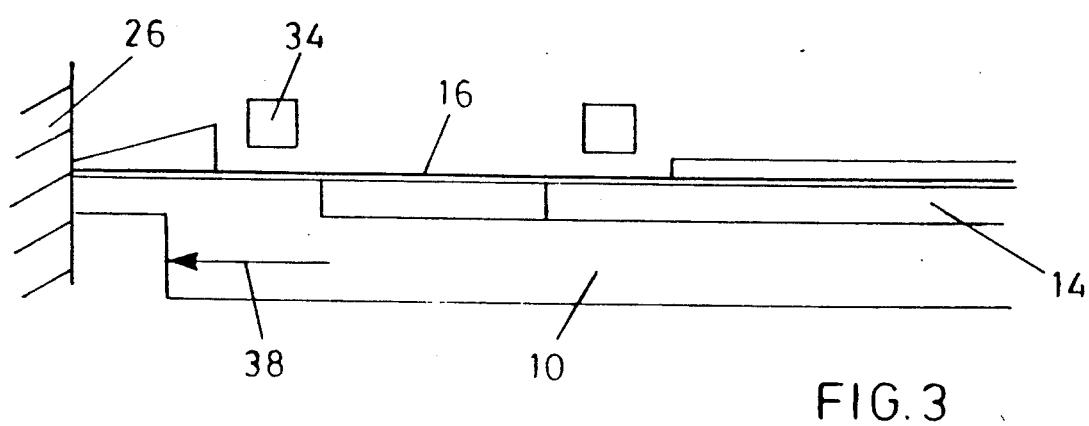

The apparatus is prepared for the commencement of a refeeding operation by moving the carriage 10 forwards, as indicated by the arrow 38 in FIG. 3, until the nose guide 12 reaches the position it adopts during machining. In FIG. 3 the front 23 of the nose guide is illustrated as being in contact with the datum 26 but in practice there may be a gap between the two. As the carriage 10 is moved forwards, any electrode 16 projecting far enough in front of the nose guide 12 to engage the datum 26 will be prevented from moving in conjunction with the carriage and so will slide back relative to the cartridge 14 as the carriage 10 continues to advance.

This does not bring about the problems with buckling electrodes discussed in connection with the prior art because there is no friction pad biasing the electrodes against the cartridge to resist the sliding motion. Some friction is necessary, however, to effect the initial motion of the electrodes 16 in conjunction with the motion of the carriage but, because the cartridge 14 and nose guide 12 move in unison, the naturally occurring friction of the electrodes 16 within the grooves 30 and holes 22 is sufficient. The friction pad of the prior art was necessary because there was relative motion between the cartridge and the nose guide, so that the friction within the nose guide had to be overcome with a friction pad. In the present method there is no such relative motion to require a friction pad.

Figure 4:
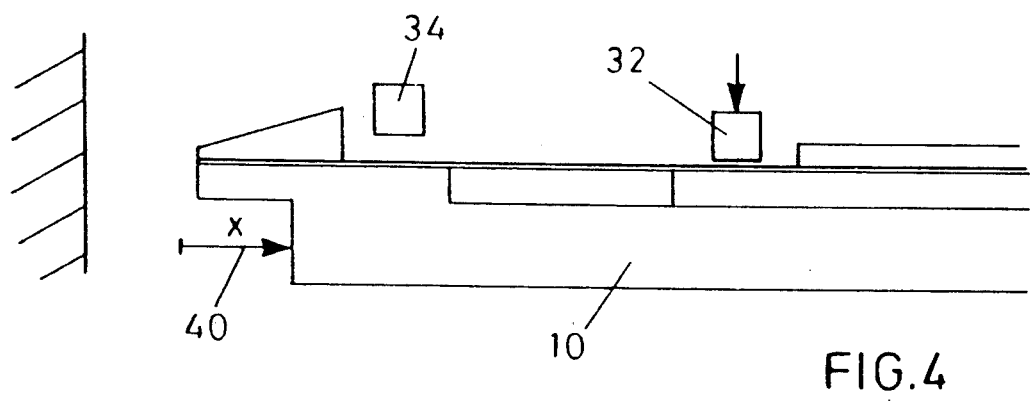

The first stage of the cycle is to retract the carriage 10, together with the cartridge 14 and electrodes 16, from the datum 26 by a distance x as shown by arrow 40 of FIG. 4. It is possible to rely on friction to effect the withdrawal of the electrodes 16 but either clamp 32 or 34 may alternatively be engaged and FIG. 4 illustrates the cartridge clamp 32 in operation.

Figure 5:
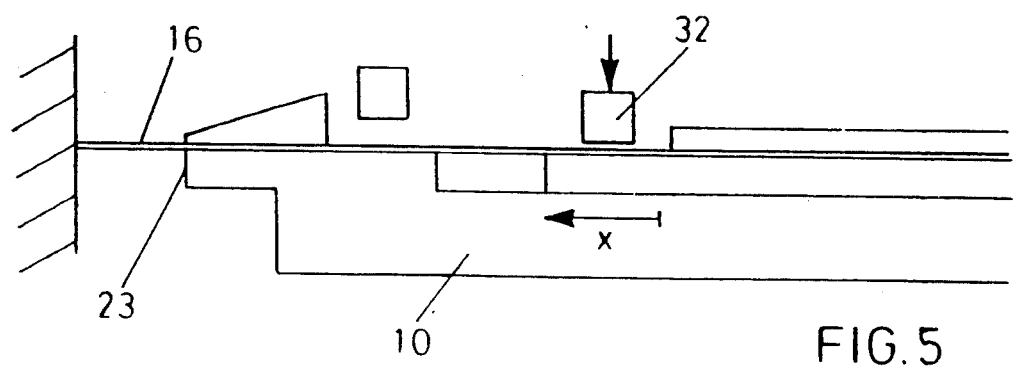

The second stage of the cycle is to advance the cartridge 14 relative to the carriage 10 by the same distance x that the carriage was withdrawn during the first stage. During the advance of the cartridge, the cartridge clamp 32 is operated to cause simultaneous forward motion of the electrodes 16 through the holes 22 in the nose guide. so that the longest of the electrodes 16 engage the datum 26 (FIG. 5).

The third stage of the cycle is to advance the carriage 10 by distance x towards the datum 26 in unison with the cartridge 14 and with both clamps 32 and 34 disengaged. Those electrodes 16 that have not engaged the datum 26 will advance in conjunction with the motion of the carriage 10 and those that have already engaged the datum 26 will slide back relative to the cartridge 14 as described above in connection with FIG. 3.

Figure 6:
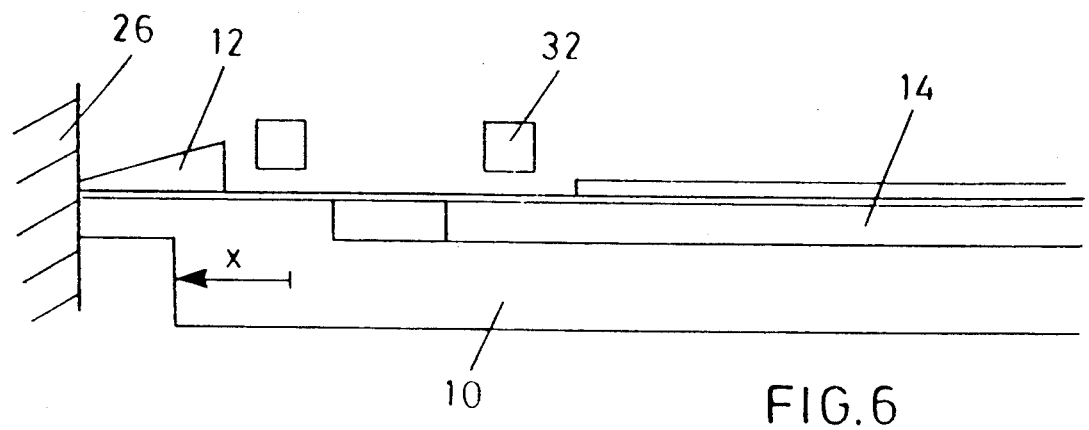
FIG. 6 shows the apparatus after the completion of a refeeding cycle.

At the end of the third stage, shown in FIG. 6, the longest of the electrodes 16 are aligned with one another in contact with the workpiece 26. Any electrodes that are not yet aligned have been advanced by a distance x from their position at the start of the cycle. Finally, the cartridge 14 has advanced by distance x towards the nose guide 12.

The apparatus is then in a suitable configuration for repeating the refeed cycle from the first stage. A few repetitions of the cycle will usually suffice to align all of the electrodes and the number of cycles possible is only limited by the closing of the gap between the nose guide 12 and the cartridge 14.

Figure 7:
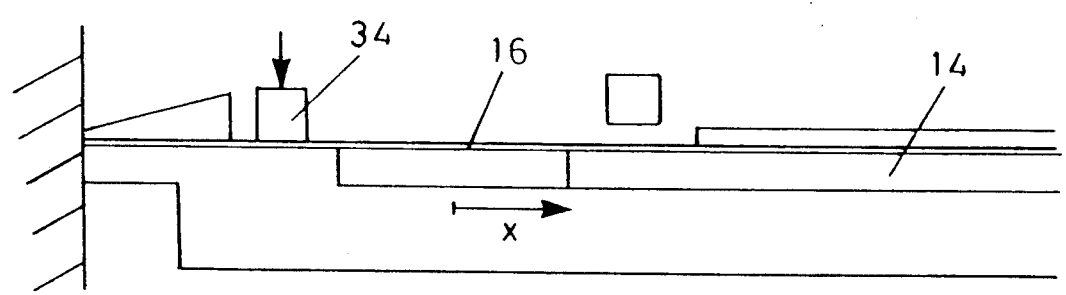
FIG. 7 shows the apparatus after an optional further stage of the refeeding cycle.

If the desired number of refeed cycles cannot be completed because the gap between the nose guide and the cartridge becomes too small, then an optional further stage can be included at the end of the cycle. This involves the engagement of the nose guide clamp 34 to hold the electrodes 16 motionless while the cartridge 14 is withdrawn by distance x, extending the gap as shown in FIG. 7. The cycle may then be repeated from the first stage just as previously.

When all the electrode tips 24 are aligned, or when a predetermined number of refeed cycles have been completed, the nose guide clamp 34 is engaged and the cartridge 14 is retracted to prepare the apparatus for machining.

I claim:

1. A method of refeeding electrodes in an electrical discharge machining apparatus having a nose guide and an electrode datum movable relative to one another, a cartridge movable relative to the nose guide, a plurality of substantially parallel electrodes supported by the nose guide and by the cartridge so as to be longitudinally movable, and a cartridge clamp engageable to prevent relative motion between the electrode and the cartridge comprising the steps:

(a) increasing separation of a datum from the nose guide, cartridge and electrodes by a predetermined distance;

(b) advancing the cartridge relative to the nose guide by the predetermined distance, while the cartridge clamp is engaged;

(c) decreasing the separation of the datum from the nose guide and cartridge by the predetermined distance while the cartridge clamp is disengaged to engage at least two of the electrodes with the datum so as to cause relative movement between those at least two electrodes and the nose guide and cartridge; and (d) retracting the cartridge relative to the nose guide while the cartridge clamp is disengaged.

2. A method according to claim 1 wherein:
in step (d) the cartridge is retracted to a position suitable for machining to begin.

3. A method according to claim 1 wherein:
in step (d) the cartridge is retracted by the predetermined distance.

4. A method according to claim 3 wherein:
the method comprises a repetition of the steps (a), (b), (c), and (d).

5. A method according to claim 4 wherein:
the cartridge clamp is engage during step (a).

6. A method according to claim 4 wherein:
a nose guide clamp is engageable to prevent relative motion between the electrodes and the nose guide, and the nose guide clamp is engaged during step (d) of the method.

7. A method according to claim 1 in which:
the electrode datum is a surface of a workpiece that is to be machined.

8. A method according to claim 1 in which:
the nose guide is fixed and the electrode datum is movable.

9. A method in accordance with claim 1 further comprising:
repeating steps (a) to (c) a plurality of times.

10. A method according to claim 9 wherein the method comprises:
the method comprises a repetition of the sequence of steps (a), (b), (c), and (d).

11. A method according to claim 10 wherein:
the cartridge clamp is engaged during step (a).

12. A method according to claim 10 wherein:
a nose guide clamp is engageable to prevent relative motion between the electrodes and the nose guide, and the nose guide clamp is engaged during step (d) of the method.

13. A method according to claim 9 in which:
the electrode datum is a surface of a workpiece that is to be machined.

14. A method according to claim 9 in which:
the nose guide is fixed and the electrode datum is movable.

* * * * *